(12) United States Patent
Pedireddy et al.

(10) Patent No.: US 11,701,639 B2
(45) Date of Patent: Jul. 18, 2023

(54) SINGLE METAL ATOM OR BIMETALLIC ALLOY HETEROGENEOUS CATALYSTS ON A CARBONACEOUS SUPPORT PRODUCED BY METAL PRECURSOR DEPOSITION ON EXOELECTROGEN BACTERIA AND PYROLYZING

(71) Applicant: King Abdullah University of Science and Technology, Thuwal (SA)

(72) Inventors: Srikanth Pedireddy, Thuwal (SA); Krishna P. Katuri, Thuwal (SA); Veerraghavulu Sapireddy, Thuwal (SA); Pascal E. Saikaly, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/266,333

(22) PCT Filed: Aug. 6, 2019

(86) PCT No.: PCT/IB2019/056696
§ 371 (c)(1),
(2) Date: Feb. 5, 2021

(87) PCT Pub. No.: WO2020/031090
PCT Pub. Date: Feb. 13, 2020

(65) Prior Publication Data
US 2021/0316290 A1    Oct. 14, 2021

Related U.S. Application Data

(60) Provisional application No. 62/715,160, filed on Aug. 6, 2018.

(51) Int. Cl.
*B01J 23/70*    (2006.01)
*C25B 11/089*    (2021.01)
(Continued)

(52) U.S. Cl.
CPC .............. *B01J 23/70* (2013.01); *B01J 21/18* (2013.01); *B01J 23/42* (2013.01); *B01J 23/44* (2013.01);
(Continued)

(58) Field of Classification Search
CPC . B01J 35/004; B01J 21/18; B01J 23/42; B01J 23/44; B01J 23/462; B01J 23/468;
(Continued)

(56) References Cited

U.S. PATENT DOCUMENTS 4,978,649 A * 12/1990 Surovikin ................ B01J 20/20
502/433
7,875,569 B2 * 1/2011 Roev ..................... B01J 37/0205
420/466

(Continued)

FOREIGN PATENT DOCUMENTS

CN    10 6914237    *    7/2017    .............. B01J 23/42
CN    107175113        9/2017
(Continued)

OTHER PUBLICATIONS

Tuanfeng Li et al., "Photochemical Solid-Phase Synthesis of Platinum Single Atoms on Nitrogen-Doped Carbon with High Loading as Bifunctional Catalysts for Hydrogen Evolution and Oxygen Reduction Reactions." ACS Catalysis 8. pp. 8450-8458. (Year: 2018).*

(Continued)

*Primary Examiner* — Patricia L. Hailey
(74) *Attorney, Agent, or Firm* — Pabst Patent Group LLP

(57) ABSTRACT

Carbon-based single metal atom or bimetallic, trimetallic, or multimetallic alloy transition metal-containing catalysts derived from exoelectrogen bacteria and their methods of making and using thereof are described. The method comprising the steps of: (a) preparing a solution medium com- (Continued)

prising at least an electron donor and an electron acceptor comprised of one or more salts of a transition metal; (b) providing exoelectrogen bacterial cells and mixing the exoelectrogen bacterial cells into the solution medium of step (a); (c) incubating the solution medium of step (b); (d) isolating the exoelectrogen bacterial cells from the incubated solution medium of step (c); and (e) pyrolyzing the exoelectrogen bacterial cells resulting in formation of the catalyst. The electron donor can be formate, acetate, or hydrogen.

19 Claims, 8 Drawing Sheets

(51) Int. Cl.
| | |
|---|---|
| C25B 11/081 | (2021.01) |
| C25B 11/065 | (2021.01) |
| C25B 11/054 | (2021.01) |
| C25B 11/075 | (2021.01) |
| B01J 21/18 | (2006.01) |
| B01J 23/42 | (2006.01) |
| B01J 23/44 | (2006.01) |
| B01J 23/46 | (2006.01) |
| B01J 23/72 | (2006.01) |
| B01J 23/745 | (2006.01) |
| B01J 35/00 | (2006.01) |
| B01J 35/10 | (2006.01) |
| B01J 37/04 | (2006.01) |
| B01J 37/08 | (2006.01) |
| B01J 37/36 | (2006.01) |
| B22F 1/18 | (2022.01) |
| B22F 1/07 | (2022.01) |

(52) U.S. Cl.
CPC ........... *B01J 23/462* (2013.01); *B01J 23/468* (2013.01); *B01J 23/72* (2013.01); *B01J 23/745* (2013.01); *B01J 35/004* (2013.01); *B01J 35/0033* (2013.01); *B01J 35/1019* (2013.01); *B01J 35/1023* (2013.01); *B01J 35/1038* (2013.01); *B01J 35/1042* (2013.01); *B01J 37/04* (2013.01); *B01J 37/084* (2013.01); *B01J 37/36* (2013.01); *B22F 1/07* (2022.01); *B22F 1/18* (2022.01); *C25B 11/054* (2021.01); *C25B 11/065* (2021.01); *C25B 11/075* (2021.01); *C25B 11/081* (2021.01); *C25B 11/089* (2021.01)

(58) Field of Classification Search
CPC ...... B01J 23/72; B01J 23/745; B01J 35/0033; B01J 35/1019; B01J 35/1023; B01J 35/1038; B01J 35/1042; B01J 37/04; B01J 37/084; B01J 37/36; C25B 11/089; C25B 11/081; C25B 11/065; C25B 11/054; C25B 11/075

USPC .... 502/182, 184, 185, 7; 420/441, 456, 457, 420/466; 423/460, 445 R, 448; 977/894
See application file for complete search history.

(56) References Cited

U.S. PATENT DOCUMENTS

| | | | | |
|---|---|---|---|---|
| 8,785,343 | B2* | 7/2014 | Liu | B01J 23/835 |
| | | | | 502/343 |
| 8,937,203 | B2* | 1/2015 | Zhou | B01J 23/96 |
| | | | | 502/313 |
| 10,658,692 | B1* | 5/2020 | Zhang | H01M 4/9008 |
| 2007/0116625 | A1* | 5/2007 | Joo | H01M 4/926 |
| | | | | 429/492 |
| 2012/0004098 | A1 | 1/2012 | Xiao | |
| 2013/0137009 | A1* | 5/2013 | Jin | H01M 4/926 |
| | | | | 502/313 |
| 2013/0211106 | A1* | 8/2013 | El-Shall | B01J 23/745 |
| | | | | 564/171 |
| 2015/0017570 | A1 | 1/2015 | Yang | |
| 2015/0050583 | A1* | 2/2015 | Schuth | B01J 23/745 |
| | | | | 429/525 |
| 2016/0368579 | A1 | 12/2016 | Willows | |
| 2020/0203734 | A1* | 6/2020 | Yang | H01M 4/8807 |
| 2021/0394161 | A1* | 12/2021 | Bae | B01J 37/0201 |

FOREIGN PATENT DOCUMENTS

| | | |
|---|---|---|
| EP | 2386355 | 11/2011 |
| WO | 2015049959 | 4/2015 |
| WO | 2018205610 | 11/2018 |

OTHER PUBLICATIONS

Choi, et al., "Automotive Emission Control Catalysts", Catalysts, 6:155, 4 pages (2016).
Kalz, et al., "Future Challenges in Heterogeneous Catalysis: Understanding Catalysts under Dynamic Reaction Conditions", ChemCatChem., 9(1):17-29 (2017).
Liu, et al., "High performance platinum single atom electrocatalyst for oxygen reduction reaction", Nature Communications, 8:15938, 9 pages (2017).
O'Neill, et al., "Catalyst Design with Atomic Layer Deposition", ACS Catal, 5(3):1804-1825 (2015).
Piumetti, et al., "Catalysis in Diesel engine NOx after-treatment: a review", Catalysis, Structure & Reactivity, 1(4):155-173 (2015).
Strasser, et al., "Lattice-strain control of the activity in dealloyed core-shell fuel cell catalysts", Nature Chemistry, 2(6): 454-460 (2010).
Vajda, et al., "Catalysis Applications of Size-Selected Cluster Deposition", ACS Catal., 5(12):7152-7176 (2015).
Wang, et al., "Carbon-Supported Pt-Based Alloy Electrocatalysts for the Oxygen Reduction Reaction in Polymer Electrolyte Membrane Fuel Cells: Particle Size, Shape, and Composition Manipulation and Their Impact to Activity", Chemical Reviews, 115(9): 3433-3467 (2015).
International Search Report for PCT/IB2019/056696 dated Dec. 9, 2019.

* cited by examiner

SINGLE METAL ATOM OR BIMETALLIC ALLOY HETEROGENEOUS CATALYSTS ON A CARBONACEOUS SUPPORT PRODUCED BY METAL PRECURSOR DEPOSITION ON EXOELECTROGEN BACTERIA AND PYROLYZING

CROSS REFERENCE TO RELATED APPLICATIONS

This application is a National Phase application under 35 U.S.C. § 371 of International Application No. PCT/IB2019/056696, filed on Aug. 6, 2019, which claims priority to U.S. Provisional Patent Application No. 62/715,160, filed on Aug. 6, 2018, the contents of which are incorporated herein by reference in their entirety.

FIELD OF THE INVENTION

This invention is in the field of catalysts, particularly carbon-based transition metal catalysts derived from exoelectrogen bacteria and their methods of making and using thereof.

BACKGROUND OF THE INVENTION

The rising demand to provide solutions for needs relating to global energy, environmental pollution, depletion of fossil fuels, have put pressure on the scientific community to develop different kinds of low-cost and efficient renewable energy technologies (Future Challenges in Heterogeneous Catalysis: Understanding Catalysts under Dynamic Reaction Conditions. *ChemCatChem.* 2017, 9, 17).

Catalysis remains crucial since it can improve the efficiency, the rate, and selectivity of chemical reaction. Most of the industrial catalytic processes, energy conversions, and environmental remediation highly depend on expensive noble metal nanoparticle catalysts dispersed on supports. For example, platinum catalysts are widely used in vehicle pollution control (45% global demand), petrochemical refining and chemical production (9% global demand), and also many clean energy processes which includes fuel cells (~15% global demand) and catalytic convertors because of their high reactivity and distinctive specific interaction with reactants (Automotive Emission Control Catalysts. *Catalysts,* 2016, 6, 155; Catalysis in Diesel engine NOx aftertreatment: a review. *Catalysis, Structure & Reactivity,* 2015, 1, 4; Lattice-strain control of the activity in dealloyed core-shell fuel cell catalysts. *Nature Chemistry,* 2010, 2, 454).

At issue, however, is that only the surface atoms of the nanoparticles act as catalytically active centers, while those inside remain as spectators, which overconsumes the precious metals. For example, only 20% of metal atoms are available for catalysis in a 5 nm nanoparticles (Nanoporous gold: a new material for catalytic and sensor applications. *Phys. Chem. Chem. Phys.* 2010, 12, 12919). Downsizing the nanoparticles to clusters or single atoms can significantly increase the surface atoms (~100%), catalytic activity, and selectivity and therefore highly desirable to maximize their efficiency. Nevertheless, the large-scale synthesis of highly dispersed single atom catalysts remains a significant challenge since they are mobile and susceptible to sintering under reaction conditions.

Synthesis of supported single atom metal catalysts requires sophisticated techniques and is challenging task. Fabrication techniques such as atomic layer deposition (Catalyst Design with Atomic Layer Deposition. *ACS Catal.* 2015, 5, 1804), mass-selected soft landing (Catalysis Applications of Size-Selected Cluster Deposition. *ACS Catal.* 2015, 5, 7152), high temperature vapor transport (Thermally stable single-atom platinum-on-ceria catalysts via atom trapping. *Science,* 2016, 353, 150) and wet chemical methods (Thermally stable single-atom platinum-on-ceria catalysts via atom trapping. *Science,* 2016, 353, 150; High performance platinum single atom electrocatalyst for oxygen reduction reaction. *Nature Communications* 2017, 8, 15938) are used to synthesize atomically dispersed catalysts.

As noted, the above mentioned techniques are typically uneconomical, unsustainable, low yielding and non-scalable approaches which limit their applications. In addition, the wet chemical approach involves the use of ligands to stabilize the metal on the support which can poison the catalyst, where pretreatment (heating) is necessary to remove these ligands and activate the metal centers. However, pretreatment facilitates the aggregation of single atoms to larger particles which diminishes the catalytic activity.

Thus, there is a need to address the issues to provide metal catalysts having increased surface atoms, catalytic activity, selectivity for maximized efficiency, as well as provide methods of preparing such catalysts at scalable and larger yields.

Therefore, it is an object of the invention to provide metal-based catalysts that address the above issues.

It is also an object of the invention to provide methods of making such metal-based catalysts.

SUMMARY OF THE INVENTION

Carbon-based catalysts containing zero-valent transition single metal atoms dispersed thereon or bimetallic alloys of such zero-valent transition metal atoms are described herein.

The catalysts include thereon a plurality of at least one type of zero-valent transition metal where each forms a catalytic center formed from a single zero-valent transition metal atom. In some instances, the single zero-valent transition metal atoms are uniformly dispersed on one or more surfaces of the carbonaceous support. In some other instances, the single zero-valent transition metal atoms are non-uniformly dispersed on one or more surfaces of the carbonaceous support.

In some instances, the catalysts include thereon a plurality of bimetallic alloys formed from two zero-valent transition metals each forming a catalytic center. In some instances, the bimetallic alloys are uniformly dispersed on one or more surfaces of the carbonaceous support. In some other instances, the single zero-valent transition metal atoms are non-uniformly dispersed on one or more surfaces of the carbonaceous support.

In yet some other instances, the catalysts include thereon a combination of a plurality of a plurality of at least one type of zero-valent transition metal where each forms a catalytic center formed from a single zero-valent transition metal atom and further includes a plurality of bimetallic alloys formed from two zero-valent transition metal.

The zero-valent transition single metal atoms dispersed on the carbonaceous support can be atoms of Pt, Fe, Ag, Au, Pd, Rh, Ir, Co, Ni, Cu, and combinations thereof. For example, in some instances, the catalyst includes only single zero-valent platinum atoms dispersed thereon.

In cases where the carbon-based catalyst contains bimetallic alloys of such zero-valent transition metal atoms, the bimetallic alloys can be, for example, NiCo, NiCu, PtNi, IrNi, RhCo, PtCo, PtIr, PtRh, and combinations thereof.

In preferred embodiments, the catalysts described herein do not include any aggregates and/or clusters of zero-valent metals as determined by appropriate analyses of the catalysts, such as electron microscopy imaging. In some instances, the catalysts may be substantially free of aggregates and/or clusters of zero-valent metals.

The catalysts can have controlled densities of the single zero-valent transition metal and/or bimetallic alloy catalytic centers dispersed on the carbonaceous support.

In certain instances, the carbonaceous support is formed of a graphitized carbon. The graphitized carbon may be characterized as having a low degree of graphitization. Degree of graphitization, for example, can be altered with temperature and time during pyrolysis. In certain other instances, the carbonaceous support may be formed of a reduced graphene oxide or includes a reduced graphene oxide, which may be in the form of a coating. Reduced graphene oxide can be prepared from graphene oxide which may be prepared by known methods. In certain instances, the reduction of graphene oxide may be carried out in the presence of exoelectrogenic bacteria which metabolically generate electrons which are transferred to graphene oxide, which acts as an electron acceptor, thereby reducing the graphene oxide which acts as a carbonaceous support.

Typically, the carbonaceous supports, which may be formed of graphitized carbon and/or reduced graphene oxide are characterized as including defects. The carbonaceous supports may also be characterized as having one or more heteroatoms doped in the graphitic lattice. The heteroatoms present in the carbonaceous support originate from one or more bacteria, such as exoelectrogen bacteria. Exoelectrogen bacteria which may be the source of such heteroatoms and which may be used in the preparation of a carbonaceous support, such as by pyrolysis or by reduction of graphene oxide include, but are not limited to, *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof.

Methods of preparing metal catalysts described are provided herein. In one non-limiting example, a method of preparing the catalyst includes the steps of:

(a) preparing a solution medium comprising at least an electron donor and an electron acceptor comprised of one or more salts of a transition metal;

(b) providing exoelectrogen bacterial cells and mixing the exoelectrogen bacterial cells into the solution medium of step (a);

(c) incubating the solution medium of step (b);

(d) isolating the exoelectrogen bacterial cells from the incubated solution medium of step (c); and (e) pyrolyzing the exoelectrogen bacterial cells to obtain the catalyst.

In another non-limiting example, a method of preparing the catalyst includes the steps of:

(a') preparing a solution medium comprising at least an electron donor and an electron acceptor comprised of one or more salts of a transition metal;

(b') providing exoelectrogen bacterial cells and mixing the exoelectrogen bacterial cells into the solution medium of step (a');

(c') incubating the solution medium of step (b');

(d') providing graphene oxide (may be in the form of a solution or suspension in a suitable medium, such as water);

(e') mixing the graphene oxide into the solution of step (c') and optionally adding more electron donor to the solution where the exoelectrogen bacterial cells metabolically generate electrons which are transferred to the graphene oxide, which acts as an electron acceptor, thereby reducing the graphene oxide; and (f') isolating the exoelectrogen bacterial cells having reduced graphene oxide coated thereon to obtain the catalyst.

In preferred embodiments, as described above, pyrolysis/reduced graphene oxide are used to provide a conductive support (i.e., carbonaceous support). In other instances, a conductive support is not required for the catalysts described, as discussed below.

In other embodiments, in addition to pyrolysis and reduction of graphene oxide (GO) to form rGO coated cells, the catalysts may be formed directly from dried exoelectrogen bacterial cells which have single metal atoms or bimetallic alloys deposited thereon and can be used as heterogeneous catalysts directly. Such a method of preparing, the catalyst incudes the steps of:

(a") preparing a solution medium comprising at least an electron donor and an electron acceptor comprised of one or more salts of a transition metal;

(b") providing exoelectrogen bacterial cells and mixing the exoelectrogen bacterial cells into the solution medium of step (a");

(c") incubating the solution medium of step (b"); and (d") isolating the exoelectrogen bacterial cells from the incubated solution medium of step (c");

Typically, the medium solution is an anaerobic and sterile medium. Exemplary electron donors include, but are not limited to, formate, acetate, hydrogen or a combination thereof. Other types of organic compounds may be suitable as electron donors than those named here.

The electron acceptor can be a solid electron acceptor or a soluble electron acceptor. Suitable electron acceptors typically have a reduction potential within the range of about $-0.4$ V to $+0.8$ V (versus standard hydrogen electrode (SHE)). Exemplary electron acceptors include transition metal salts, which forms a soluble $M^{n+}$ metal ion where n is 1, 2, or 3 and M is selected from the group consisting of Pt, Fe, Ag, Au, Pd, Rh, Ir, Co, Ni, and Cu. The anion(s) of the transition metal salt cap be any anion, but is more typically a halide (e.g., fluoride, chloride, bromide, and iodide), sulfate, carbonate, bicarbonate, nitrate, phosphate, hydroxide, known chelating agents/chemicals, or combinations thereof.

The exoelectrogen bacterial cells used in the method can include *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof. Methods of preparing cultures of such bacteria, as well as isolating and purifying them are known.

Incubation of the solution medium containing both the exoelectrogen bacterial cells and the electron donor(s) and electron acceptor(s) is carried out anaerobically. Incubation may be carried out at a temperature in the range of about 20 to 40° C., at a temperature of about 25 to 35° C., or at a temperature of about 25 to 30° C. Incubation may be carried out in the dark. Incubation may be carried out for about 6 to 48 hours, 6 to 36 hours, or 6 to 24 hours.

Following incubation, the exoelectrogen bacterial cells having reduced metal atoms and/or bimetallic alloys on their cell membranes can be carried out by centrifugation, filtration, washing, or a combination thereof. One or more washings of the isolated exoelectrogen bacterial cells can be performed to remove media components present followed by drying of the isolated exoelectrogen bacterial cells.

For the first method described above, in order to provide the carbon-based single or bimetallic metal catalysts described, the isolated exoelectrogen bacterial cells having reduced metal atoms and/or bimetallic alloys on their cell membranes are typically pyrolyzed. Pyrolysis carried out by known methods at a temperature of about 500 to 1000° C., in some embodiments, between 600 and 1000° C., 700 and 1000° C., 800 and 1000° C., 900° C. and 1000° C. Such pyrolysis can be carried out for a period of time in the range of about 0.1 to 5 hours, between about 1 and 4 hours, between about 1 and 3 hrs. The pyrolysis step is generally carried out under an atmosphere comprising 1-5% hydrogen with the remaining percentage being made up of an inert gas, such as nitrogen or argon.

For the second method above, following reduction of the graphene oxide by the exoelectrogen bacterial cells the resulting catalyst can be isolated by centrifugation, filtration, washing, drying, purifying, or a combination thereof. Drying the cells may accomplished by any suitable means, which may include heating to a suitable temperature, and/or the cells may be lyophilized to remove solvents (such as water). One or more washings of the catalyst can be performed to remove media components (i.e., purify the cells) present from the catalyst. The second method described provides reduced graphene oxide as coating on the exoelectrogen bacterial cells having reduced metal atoms and/or bimetallic alloys on their cell membranes. In such cases, the bacterial morphology of the cells is preserved and possible unwanted side reactions, such as sintering when high temperatures are used does not occur. In some instances, the bacteria will remain intact in the catalyst. In other embodiments, the bacterial cell walls may be burst and the cell walls having catalytic centers thereon and reduced graphene oxide coating on the cell walls can be isolated.

For the third method above, following incubation the exoelectrogen bacterial cells can be isolated by centrifugation, filtration, washing, drying, purifying, or a combination thereof. One or more washings of the catalyst can be performed to remove media components (i.e., purify the cells) present from the catalyst. Drying the cells may accomplished by any suitable means, which may include heating to a suitable temperature, and/or the cells may be lyophilized to remove solvents (such as water). Catalysts can be formed directly from dried exoelectrogen bacterial cells which have single metal atoms or bimetallic alloys deposited thereon and can be used as heterogeneous catalysts directly.

The catalysts described herein and prepared according to the methods above have atomically dispersed zero-valent metal atoms and/or bimetallic alloys thereof present on a carbonaceous support (i.e., graphitized carbon or reduced graphene oxide). The catalysts described herein can be used as heterogeneous catalysts. The catalysts may be used in chemical catalysis, photocatalysis, or electrochemical catalysis.

DETAILED DESCRIPTION OF THE INVENTION

Figure 1:
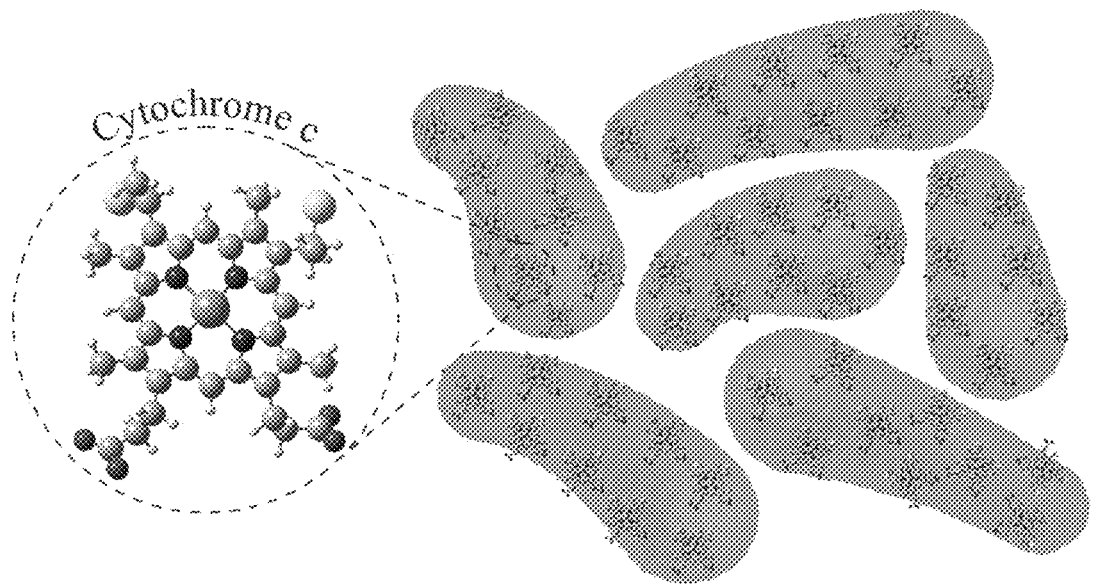
FIG. 1 shows a non-limiting illustration of exoelectrogen bacterial cells, such as *Geobacter sulfurreducens* cells, having expressed c-type cytochromes on the outer membrane of the cells which are capable of electron transfer to electron acceptors, such as transition metal ions.

Carbon-based catalysts containing either single-metal atoms, bimetallic alloys, or combinations thereof dispersed thereon and methods of preparing such catalysts are described herein.

I. Definitions

"Metal cluster" or "metal aggregate," as used herein refers to a grouping of greater than two zero-valent metal atoms, greater than three zero-valent metal atoms, or greater than four zero-valent metal atoms of the same chemical identity/type where there is direct contact and metal bonding between the metal atoms.

"Single metal atom," as used herein refers to a single zero-valent metal atom, formed of metals atoms, such as Pt, Fe, Ag, Au, Pd, Rh, Ir, Co, Ni, Cu.

"Bimetallic alloy," or "bimetallic single atom alloy," can be used interchangeably and refer to alloys of at least two zero-valent metal atoms, such as, for example, NiCo, NiCu, PtNi, IrNi, RhCo, PtCo, PtIr, and PtRh.

"Trimetallic alloy," or "trimetallic single atom alloy," can be used interchangeably and refer to alloys of at least three zero-valent metal atoms, such as, for example, PtCuAu.

"Multimetallic alloy," or "multimetallic single atom alloy," can be used interchangeably and refer to alloys of two or greater zero-valent metal atoms, such as, for example, PtCuAuNi.

Numerical ranges disclosed in the present application include, but are not limited to, ranges of temperatures, ranges of concentrations, ranges of integers, ranges of times, and ranges of temperatures, etc. The disclosed ranges of any type, disclose individually each possible number that such a range could reasonably encompass, as well as any sub-ranges and combinations of sub-ranges encompassed therein. For example, disclosure of a temperature range is intended to disclose individually every possible temperature value that such a range could encompass, consistent with the disclosure herein.

Use of the term "about" is intended to describe values either above or below the stated value, which the term "about" modifies, in a range of approx. +/−10%; in other instances the values may range in value either above or below the stated value in a range of approx. +/−5%. When the term "about" is used before a range of numbers (i.e., about 1-5) or before a series of numbers (i.e., about 1, 2, 3, 4, etc.) it is intended to modify both ends of the range of numbers or each of the numbers in the series, unless specified otherwise.

II. Carbon-Based Single or Bimetallic Transition Metal Catalysts

The carbon-based catalysts containing zero-valent transition single metal atoms dispersed thereon or bimetallic, trimetallic, or multimetallic alloys of such zero-valent transition metal atoms. In some instances, combinations of both single metal atoms and bimetallic, trimetallic, or multimetallic alloys may be dispersed on the carbonaceous support of the catalyst.

The catalysts include thereon a plurality of at least one type of zero-valent transition metal where each forms a catalytic center formed from a single zero-valent transition metal atom. In some instances, the single zero-valent transition metal atoms are uniformly dispersed on one or more surfaces of the carbonaceous support. In some other instances, the single zero-valent transition metal atoms are non-uniformly dispersed on one or more surfaces of the carbonaceous support.

In some instances, the catalysts include thereon a plurality of bimetallic, trimetallic, or multimetallic alloys formed from two zero-valent transition metals each forming a catalytic center. In some instances, the bimetallic, trimetallic, or multimetallic alloys are uniformly dispersed on one or more surfaces of the carbonaceous support. In some other instances, the single zero-valent transition metal atoms are non-uniformly dispersed on one or more surfaces of the carbonaceous support.

In yet some other instances, the catalysts include thereon a combination of a plurality of a plurality of at least one type of zero-valent transition metal where each forms a catalytic center formed from a single zero-valent transition metal atom and further includes a plurality of bimetallic, trimetallic, or multimetallic alloys formed from two zero-valent transition metal. In such instances, the catalyst may be characterized as having a ratio of the plurality of at least one type of zero-valent transition metal catalytic centers to the plurality of any one of the bimetallic, trimetallic, or multimetallic alloy catalytic centers of about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, as determined by a technique such as electron microscopy imaging.

The zero-valent transition single metal atoms dispersed on the carbonaceous support can be selected from Pt, Fe, Ag, Au, Pd, Rh, Ru, Ir, Co, Ni, Cu, and combinations thereof. For example, in some instances, the catalyst includes only single zero-valent platinum atoms dispersed thereon. Other zero-valent metals than those named here may also be formed on the catalyst using the methods described below.

In cases where the carbon-based catalyst contains bimetallic alloys of such zero-valent transition metal atoms where the bimetallic alloys can be, for example, NiCo, NiCu, PtNi, IrNi, RhCo, PtCo, PtIr, PtRh, and combinations thereof. Other bimetallic alloys of zero-valent metals than those named here may also be formed on the catalyst using the methods described below.

In certain cases, the carbon-based catalyst contain trimetallic alloys of such zero-valent transition metal atoms where the trimetallic alloys can be, for example, PtCuAu. Other trimetallic alloys of zero-valent metals than those named here may also be formed on the catalyst using the methods described below. In some instances, the carbon-based catalyst may not contain any trimetallic alloys therein.

In still other instances, the carbon-based catalyst contain mutlimetallic alloys of such zero-valent transition metal atoms where there are at least two zero-valent transition metal atoms and can be, for example, PtCuAuNi. Other multimetallic alloys of zero-valent metals than those named here may also be formed on the catalyst using the methods described below. In some instances, the carbon-based catalyst may not contain any multimetallic alloys therein.

In preferred embodiments, the catalysts described herein do not include any aggregates and/or clusters of zero-valent metals as determined by appropriate analyses of the catalysts, such as electron microscopy imaging. In some instances, the catalysts may be substantially free of aggregates and/or clusters of zero-valent metals (as used here, "substantially free," refers to catalysts where there is less than about 5%, 4%, 3%, 1%, 0.9%, 0.8%, 0.6%, 0.5%, 0.4%, 0.3%, 0.2% and 0.1% of aggregates and/or clusters present as compared to the total amount or percentage of single transition metal atom catalytic centers and/or bimetallic, trimetallic, or multimetallic alloy catalytic centers present on the catalyst). In a preferred embodiment, there is less than 0.1% aggregates and/or clusters present.

The catalysts can have controlled densities of the single zero-valent transition metal and/or bimetallic alloy catalytic centers dispersed on the carbonaceous support. For example, the catalytic centers may be present at a density of about 1 to 10 catalytic centers per area of $nm^2$ of catalyst surface area. In some instances, there are at least about 9 catalytic centers per area of $nm^2$, about 8 catalytic centers per area of $nm^2$, about 7 catalytic centers per area of $nm^2$, about 6 catalytic centers per area of $nm^2$, about 5 catalytic centers per area of $nm^2$, about 4 catalytic centers per area of $nm^2$, about 3 catalytic centers per area of $nm^2$, about 2 catalytic centers per area of $nm^2$, or about 1 catalytic center per area of $nm^2$. In preferred instances, the catalysts have densities of the single zero-valent transition metal and/or bimetallic, trimetallic, or multimetallic alloy catalytic centers dispersed on the carbonaceous support of at least about 5 catalytic centers per area of nm² of catalyst surface area.

The catalytic centers demonstrate good availability and are readily accessible for the reactants when in use because they are present on the surface of the exoelectrogen bacteria. It is believed that when the bacteria are pyrolyzed to form a graphitized carbon having the catalytic centers dispersed thereon and/or a reduced graphene oxide forms a coating on the cells that the availability and accessibility of the reactants to the catalytic centers is retained.

In certain instances, the carbonaceous support is formed of a graphitized carbon. The graphitized carbon may be characterized as having a low degree of graphitization, such as where the ratio of intensities of the Raman D and G bands ($I_D/I_G$) is about 0.85-0.95, for example, 0.85, 0.9, 0.95.

In certain other instances, the carbonaceous support may be formed of or includes a reduced graphene oxide. Reduced graphene oxide can be prepared from graphene oxide which may be prepared by known methods. Reduction of graphene oxide can be carried out thermally, chemically, or through IR or UV irradiation. Typically, a reduced graphene oxide is characterized as having a carbon atomic percentage, as determined by elemental analysis (such as by XPS) of at least about 75-90 at %, or 80-90 at %. In certain instances, the reduction of graphene oxide may be carried out in the presence of exoelectrogenic bacteria which metabolically generate electrons which are transferred to graphene oxide, which acts as an electron acceptor, thereby reducing the graphene oxide which acts as a carbonaceous support.

Typically, the carbonaceous supports, which may be formed of graphitized carbon and/or reduced graphene oxide are characterized as including defects. The carbonaceous supports may also be characterized as having one or more heteroatoms doped in the graphitic lattice; where the heteroatoms can include nitrogen, oxygen, hydrogen, sulfur, phosphorus, and combinations thereof. The heteroatoms present in the carbonaceous support originate from one or more bacteria, such as exoelectrogen bacteria. Exoelectrogen bacteria which may be the source of such heteroatoms and which may be used in the preparation of a carbonaceous support, such as by pyrolysis or by reduction of graphene oxide include, but are not limited to, *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof.

The carbonaceous support may be nanoporous, microporous, and/or mesoporous. In some instances, the carbonaceous support is mesoporous and contains mesopores having a volume ranging from about 0.1 to 0.8 cm³ about 0.1 to 0.7 cm³ g⁻¹, about 0.1 to 0.6 cm³ g⁻¹, about 0.1 to 0.5 cm³ about 0.1 to 0.4 cm³ g⁻¹, about 0.1 to 0.3 cm³ g⁻¹, or about 0.1 to 0.2 cm³ g⁻¹.

The carbonaceous support can have a surface area, as measured by Brunauer-Emmett-Teller method, ranging from about 100 to 700 m² g⁻¹, about 100 to 650 m² g⁻¹, about 100 to 600 m² g⁻¹, or about 100 to 500 m² g⁻¹.

III. Methods for Preparing Single or Bimetallic, Trimetallic, or Multimetallic Alloy Transition Metal Catalysts Methods of preparing metal catalysts described are provided herein. In one non-limning example, a method of preparing the catalyst includes the steps of:

(a) preparing a solution medium comprising at least an electron donor and an electron acceptor comprised of one or more salts of a transition metal;

(b) providing exoelectrogen bacterial cells and mixing the exoelectrogen bacterial cells into the solution medium of step (a);

(c) incubating the solution medium of step (b);

(d) isolating the exoelectrogen bacterial cells from the incubated solution medium of step (c); and (e) pyrolyzing the exoelectrogen bacterial cells resulting in formation of a catalyst.

In another non-limiting example, a method of preparing the catalyst includes the steps of:

(a') preparing a solution medium comprising at least an electron donor and an electron acceptor comprised of one or more salts of a transition metal;

(b') providing exoelectrogen bacterial cells and mixing the exoelectrogen bacterial cells into the solution medium of step (a');

(c') incubating the solution medium of step (b');

(d') providing graphene oxide (may be in the form of a solution or suspension in a suitable medium, such as water);

(e') mixing the graphene oxide into the solution of step (c') and optionally adding more electron donor to the solution where the exoelectrogen bacterial cells metabolically generate electrons which are transferred to the graphene oxide, which acts as an electron acceptor, thereby reducing the graphene oxide; and (f') isolating the exoelectrogen bacterial cells having reduced graphene oxide coated thereon.

In other embodiments, in addition to pyrolysis and reduction of graphene oxide to form rGO coated cells, the catalysts may be formed directly from dried exoelectrogen bacterial cells which have single metal atoms or bimetallic, trimetallic, or multimetallic alloys deposited thereon and can be used as heterogeneous catalysts directly. Such a method of prepaying the catalyst includes the steps of:

(a") preparing a solution medium comprising at least an electron donor and an electron acceptor comprised of one or more salts of a transition metal;

(b") providing exoelectrogen bacterial cells and mixing the exoelectrogen bacterial cells into the solution medium of step (a");

(c") incubating the solution medium of step (b"); and (d") isolating the exoelectrogen bacterial cells from the incubated solution medium of step (c");

In the exemplary methods described herein, the catalytic centers (single metal atoms and/or bimetallic, trimetallic, or multimetallic alloys) formed are readily accessible to reactants during catalysis because the methods described don't require or include the addition of any ligands to stabilize the catalytic centers (single metal atoms and/or bimetallic, trimetallic, or multimetallic alloys) formed on the surface of the catalysts formed.

Typically, the medium solution is an anaerobic and sterile medium. Exemplary electron donors include, but are not limited to, formate, acetate, hydrogen, or a combination thereof. Other types of organic compounds may be suitable as electron donors than those named here. The electron donor is typically present at a concentration range of about 1 to 25 mM, 1 to 20 mM, 1 to 15 mM, 1 to 10 mM, 1 to 5 mM.

The electron acceptor can be a solid electron acceptor or a soluble electron acceptor. Suitable electron acceptors typically have a reduction potential within the range of about −0.4 V to +0.8 V (versus standard hydrogen electrode (SHE)). Exemplary electron acceptors include transition metal salts, which forms a soluble M$^{n+}$ metal ion where n is 1, 2, or 3 and M is selected from the group consisting of Pt, Fe, Ag, Au, Pd, Rh, Ru, Ir, Co, Ni, and Cu. The anion(s) of the transition metal salt can be ally anion, but is more typically a halide (e.g., fluoride, chloride, bromide, and iodide), sulfate, carbonate, bicarbonate, nitrate, phosphate, hydroxide, known chelating agents/chemicals, or combinations thereof. The electron acceptor may also be, for example, a metal oxide of a transition metal, such as $Fe_3O_4$. The electron acceptor may also be an elemental sulfur. The electron acceptor is typically present at a concentration range of about 1 to 100 mM, 1 to 90 mM, 1 to 80 mM, 1 to 70 mM, 1 to 50 mM, 1 to 40 mM, 1 to 30 mM, 1 to 20 mM, or 1 to 20 mM.

The exoelectrogen bacterial cells used in the method can include *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof. Methods of preparing cultures of such bacteria and isolating and purifying them are known.

It is believed that exoelectrogen bacteria, such as those described above, include a plurality of cytochromes (associated on their outer membranes). Such cytochromes (multiheme c-type cytochromes) allow for reduction of electron acceptors outside the cell membrane (see FIG. 2). Outer membrane c-type cytochromes can include, for example, OmcE, OmcS, OmcZ, OmcA, ppcA, and mtrA which are capable of extracellular electron transfer.

In some instances, it is possible to control the density of catalytic centers (single metal atoms and/or bimetallic, trimetallic, or multimetallic alloys) which are formed on the cell surface of the exoelectrogen bacteria by selectively overexpressing the cytochromes to increase their surface density) and subjecting cells with overexpressed cytochromes to electron acceptors and subsequently using the over-expressed cytochrome cells for the synthesis of single atom metal or bimetallic, trimetallic, or multimetallic alloy catalytic centers on the surface of the cells with the aim of increasing and/or controlling their density. In other instances, control of the density of catalytic centers (single metal atoms and/or bimetallic, trimetallic, or multimetallic alloys) formed on the cell surface of the exoelectrogen bacteria can be controlled as a function of concentration of electron donor, electron acceptor, time, and combinations thereof depends on concentration and time.

Incubation of the solution medium containing both the exoelectrogen bacterial cells and the electron donor(s) and electron acceptor(s) is carried out anaerobically. Incubation may be carried out at a temperature in the range of about 20 to 40° C., at a temperature of about 25 to 35° C., or at a temperature of about 25 to 30° C. Incubation may be carried out in the dark. Incubation may be carried out for about 6 to 48 hours, 6 to 36 hours, or 6 to 24 hours.

Following incubation, the exoelectrogen bacterial cells having reduced metal atoms and/or bimetallic, trimetallic, or multimetallic alloys on their cell membranes can be carried out by centrifugation, filtration, washing, or a combination thereof.

One or more washings of the isolated exoelectrogen bacterial cells can be performed to remove media components present followed by drying of the isolated exoelectrogen bacterial cells.

For the first method described above, in order to provide the carbon-based single or bimetallic, trimetallic, or multimetallic metal catalysts described, the isolated exoelectrogen bacterial cells having reduced metal atoms and/or bimetallic alloys, trimetallic, or multimetallic on their cell membranes are typically pyrolyzed. Pyrolysis carried out by known methods at a temperature of about 500 to 1000° C., in some embodiments, between 600 and 1000° C., 700 and 1000° C., 800 and 1000° C., 900° C. and 1000° C. Such pyrolysis can be carried out for a period of time in the range of about 0.1 to 5 hours, between about 1 and 4 hours, between about 1 and 3 hrs. The degree of graphitization can be controlled as a function of pyrolysis temperature and duration. The pyrolysis step is generally carried out under an atmosphere comprising 1-5% hydrogen with the remaining percentage being made up of an inert gas, such as nitrogen or argon. For the second method above, following reduction of the graphene oxide by the exoelectrogen bacterial cells the resulting catalyst can be isolated by centrifugation, filtration, washing, drying, purifying, or a combination thereof. Drying the cells may accomplished by any suitable means, which may include heating to a suitable temperature, and/or the cells may be lyophilized to remove solvents (such as water). One or more washings of the catalyst can be performed to remove media components (i.e., purify the cells) present from the catalyst.

The second method described provides reduced graphene oxide coating the exoelectrogen bacterial cells having reduced metal atoms and/or bimetallic, trimetallic, or multimetallic alloys on their cell membranes. In such cases, the bacterial morphology of the cells is preserved and possible unwanted side reactions, such as sintering when high temperatures are used does not occur. In some instances, the bacteria will remain intact in the catalyst. In other embodiments, the bacterial cell walls may be burst and the cell walls having catalytic centers thereon and reduced graphene oxide coating on the cell walls can be isolated.

For the third method above, following incubation the exoelectrogen bacterial cells can be isolated by centrifugation, filtration, washing, drying, purifying, or a combination thereof. One or more washings of the catalyst can be performed to remove media components (i.e., purify the cells) present from the catalyst. Drying the cells may accomplished by any suitable means, which may include heating to a suitable temperature, and/or the cells may be lyophilized to remove solvents (such as water). Catalysts can be formed directly from dried exoelectrogen bacterial cells which have single metal atoms or bimetallic, trimetallic, or multimetallic alloys deposited thereon and can be used as heterogeneous catalysts directly.

The resulting catalysts prepared by the above method can be characterized by such methods including, but not limited to, electron microscopy (i.e., TEM, SEM, STEM), X-ray diffraction (XRD), X-ray Photoelectron Spectroscopy (XPS), Energy dispersive X-ray (EDS), Raman spectroscopy, Brunaer-Emmett-Teller (BET), Inductively coupled plasma atomic/mass emission spectroscopy (ICP-OES/MS), X-ray absorption spectroscopy (XAS), Diffuse reflectance infrared Fourier transform spectroscopy (DRIFTS), etc. to establish the properties of the catalyst prepared.

IV. Catalyst Applications

The catalysts described herein and prepared according to the methods above have atomically dispersed zero-valent metal atoms and/or bimetallic, trimetallic, or multimetallic alloys thereof present on a carbonaceous support (i.e., graphitized carbon or reduced graphene oxide). The catalysts may be used in chemical catalysis, photocatalysis, or electrochemical catalysis.

In certain instances, the catalysts described may be used in electrocatalytic applications including, but not limited to, hydrogen evolution reaction (HER), oxygen evolution reaction (OER), oxygen reduction reaction (ORR), electro-oxidation of formic acid (FAOR), and electro-oxidation of methanol (MOR). In some embodiments, the catalysts described herein is at least bifunctional, for example, the catalyst can be used to catalyze both electrochemical oxidation and electrochemical reduction. In particular embodiments, the catalysts described herein HER and OER, reducing the costs and improving the costs associated with these catalytic activities.

In certain instances, the catalysts described may be used in chemical catalysis applications including, but not limited to, the direct and selective oxidation of organic compounds (such as benzene to phenol; methane to methanol), C—H activation reactions, selective hydroxylation of organic compounds, and selective hydrogenation of organic compounds.

The disclosed catalysts and methods can be further understood through the following numbered paragraphs.

1. A single atom or bimetallic alloy catalyst comprising:
   a carbonaceous support;
   a plurality of at least one type of zero-valent transition metal dispersed on the carbonaceous support.
2. The catalyst of paragraph 1, wherein the at least one zero-valent transition metal is a formed of a single atom of the zero-valent transition metal.
3. The catalyst of any one of paragraphs 1-2, wherein the at least one zero-valent transition metal is selected from the group consisting of Pt, Fe, Ag, Au, Pd, Rh, Ru, Ir, Co, Ni, Cu, and combinations thereof.
4. The catalyst of paragraph 1, wherein the at least one zero-valent transition metal is a bimetallic alloy of at least two transition metals.
5. The catalyst of paragraph 4, wherein the bimetallic alloy is selected from the group consisting of NiCo, NiCu, PtNi, IrNi, RhCo, PtCo, PtIr, PtRh, and combinations thereof.
6. The catalyst of any one of paragraphs 1-5, wherein the plurality of the at least one type of zero-valent transition metal is uniformly dispersed on surfaces of the carbonaceous support.
7. The catalyst of any one of paragraphs 1-6, wherein the plurality of the at least one type of zero-valent transition metal is formed of isolated single atoms of the zero-valent transition metal which are dispersed on the carbonaceous support.
8. The catalyst of any one of paragraphs 4-7, wherein the bimetallic alloy is uniformly dispersed on one or more surfaces of the carbonaceous support.
9. The catalyst of any preceding paragraph, wherein the catalyst does not comprise aggregates and/or clusters of zero-valent metals.
10. The catalyst of any preceding paragraph, wherein the carbonaceous support is a graphitized carbon.
11. The catalyst of any preceding paragraph, wherein the carbonaceous support is mesoporous.
12. The catalyst of paragraph 11, wherein the mesoporous carbonaceous support comprises mesopores having a volume ranging from about 0.1 to 0.8 cm$^3$ g$^{-1}$, about 0.1 to 0.7 cm$^3$ g$^{-1}$, about 0.1 to 0.6 cm$^3$ g$^{-1}$, about 0.1 to 0.5 cm$^3$ g$^{-1}$, about 0.1 to 0.4 cm$^3$ g$^{-1}$, about 0.1 to 0.3 cm$^3$ g$^{-1}$, or about 0.1 to 0.2 cm$^3$ g$^{-1}$.
13. The catalyst of any preceding paragraph, wherein the carbonaceous support has a surface area, as measured by Brunauer-Emmett-Teller method, ranging from about 100 to 700 m$^2$ g$^{-1}$, about 100 to 650 m$^2$ g$^{-1}$, about 100 to 600 m$^2$ g$^{-1}$, or about 100 to 500 m$^2$ g$^{-1}$.
14. The catalyst of any preceding paragraph, wherein the carbonaceous support is a graphitized carbon comprising heteroatom doping; wherein the heteroatoms are selected from nitrogen, oxygen, hydrogen, sulfur, phosphorus, and combinations thereof.
15. The catalyst of paragraph 14, wherein the heteroatoms present in the carbonaceous support originate from exoelectrogen bacteria.
selected from the group consisting of *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof.
16. The catalyst of any preceding paragraph, wherein the catalyst is an electrocatalyst or a photocatalyst.
17. A method of preparing a single atom or bimetallic alloy catalyst of paragraph 1, the method comprising the steps of:
   (a) preparing a solution medium comprising at least an electron donor and an electron acceptor comprised of one or more salts of a transition metal;
   (b) providing exoelectrogen bacterial cells and mixing the exoelectrogen bacterial cells into the solution medium of step (a);
   (c) incubating the solution medium of step (b);
   (d) isolating the exoelectrogen bacterial cells from the incubated solution medium of step (c); and
   (e) pyrolyzing the exoelectrogen bacterial cells resulting in formation of the catalyst.
18. The method of paragraph 17, wherein the electron donor is formate, acetate, or hydrogen.
19. The method of any one of paragraphs 17-18, wherein the transition metal of the one or more salts forms a soluble M$^{n+}$ metal ion where n is 1, 2, or 3 and M is selected from the group consisting of Pt, Fe, Ag, Au, Pd, Rh, Ru, Ir, Co, Ni, and Cu.
20. The method of any one of paragraphs 17-19, wherein exoelectrogen bacterial cells are selected from the group consisting of *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof.
21. The catalyst of any of paragraphs 1-16 can be used in electrocatalytic applications including, but not limited to, hydrogen evolution reaction (HER), oxygen evolution reaction (OER), oxygen reduction reaction (ORR), electro-oxidation of formic acid (FAOR), and electro-oxidation of methanol (MOR).

EXAMPLES

Example 1

Methods:
Bacterial Strain and Culture Conditions:
*Geobacter sulfurreducens* strain PCA (ATCC 51573) was grown in batch cultures at 30° C. The medium contained the following salts (per liter): 1.5 g of NH$_4$Cl, 0.6 g of $Na_2HPO_4$, 0.1 g of KCl, 0.82 g of Na-acetate, 2.5 g of $NaHCO_3$, 8.0 g of Nae-fumarate, 10 ml of each a vitamin solution and trace element solution. To the culture media 10 mM of acetate was provided as the sole carbon and electron source, and 50 mM of fumarate as electron acceptor. The media was flushed with $N_2$—$CO_2$ (80:20) for at least 40 min to remove oxygen and achieve anaerobic conditions and to maintain the pH at 7. The inoculation was performed in an anaerobic glove box and the culture bottle was kept in incubator shaker (130 rpm, 30° C.) for 3 days. Later, the culture suspension was centrifuged at 7000 rpm for 5 min and the resultant cell pellet was washed with sterile medium solution (lacking fumarate) three times prior to being inoculated for the synthesis of single atom metal catalysts with tunable chemical identity described below.

Synthesis of Single Atom Platinum by *G. sulfuredreducens* (Pt/GS):

For the synthesis of single atom platinum on the outer membrane of the *Geobacter sulfurreducens* bacterial cell; 16 mg of a platinum salt, $K_2PtCl_6$, was added into 500 mL of an anaerobic medium solution containing 10 mM acetate as the sole electron donor in a rubber septated serum vial. The concentrated cell pellet collected after centrifugation of 2 L batch culture was injected into the vial and incubated anaerobically at 30° C. under dark for one day. The resulting solution was centrifuged at 7000 rpm for 5 minutes, then washed with Milli-Q water four times to remove media components and then dried in vacuum dryer at room temperature for overnight. The dried sample was used for further characterizations.

Synthesis of Single Atom Platinum on Graphitized Carbon (Pt/C) by Pyrolysis of Geobacter Sulfuredreducens (Pt/GS):

To provide conducting surface for electro-catalytic applications, the dried sample of bacterial cells was subjected to pyrolysis (800° C., 1 h, 10 mL/min 5% $H_2$ and 95% $N_2$) to obtain a single metal atom Pt/C catalyst.

Synthesis of Single Atom Iron on Graphitized Carbon (Fe/C) by Pyrolysis of Geobacter Sulfuredreducens (GS):

In addition to the Pt/C catalyst prepared above, a dried sample of *Geobacter sulfurreducens* bacterial cells, which was not exposed to any metal salt(s), was subjected to pyrolysis (800° C., 1 h, 10 mL/min 5% $H_2$) to obtain a single metal atom Fe/C catalyst.

Synthesis of Single Atom Platinum by *G. sulfuredreducens* (Ir/GS)

For the synthesis of single atom iridium (Ir) on the outer membrane of the bacterial cell; 12 mg of $IrCl_3.xH2O$ was added into 500 mL of an anaerobic medium solution containing 10 mM acetate as the sole electron donor in a rubber septated serum vial. The concentrated cell pellet collected after centrifugation of 2 L batch culture was injected into the vial and incubated anaerobically at 30° C. under dark for one day. The resulting solution was centrifuged at 7000 rpm for 5 minutes, then washed with Milli-Q water four times to remove media components and then dried in vacuum dryer at room temperature for overnight. The dried sample was used for further characterizations.

Synthesis of Single Atom Platinum by *G. sulfuredreducens* (Ru/GS)

For the synthesis of single atom ruthenium (Ru) on the outer membrane of the bacterial cell; 16 mg of $RuCl_3.3H_2O$ was added into 500 mL of an anaerobic medium solution containing 10 mM acetate as the sole electron donor in a rubber septated serum vial. The concentrated cell pellet collected after centrifugation of 2 L batch culture was injected into the vial and incubated anaerobically at 30° C. under dark for one day. The resulting solution was centrifuged at 7000 rpm for 5 minutes, then washed with Milli-Q water four times to remove media components and then dried in vacuum dryer at room temperature for overnight. The dried sample was used for further characterizations.

Synthesis of Single Atom Platinum by *G. sulfuredreducens* (Pd/GS)

For the synthesis of single atom palladium (Pd) on the outer membrane of the bacterial cell; 15 mg of $PdNO3.2H_2O$ was added into 500 mL of an anaerobic medium solution containing 10 mM acetate as the sole electron donor in a rubber septated serum vial. The concentrated cell pellet collected after centrifugation of 2 L batch culture was injected into the vial and incubated anaerobically at 30° C. under dark for one day. The resulting solution was centrifuged at 7000 rpm for 5 minutes, then washed with Milli-Q water four times to remove media components and then dried in vacuum dryer at room temperature for overnight. The dried sample was used for further characterizations.

Synthesis of Single Atom Platinum by *G. sulfuredreducens* (Cu/GS)

For the synthesis of single atom copper (Cu) on the outer membrane of the bacterial cell; 10 mg of CuCl was added into 500 mL of an anaerobic medium solution containing 10 mM acetate as the sole electron donor in a rubber septated serum vial. The concentrated cell pellet collected after centrifugation of 2 L batch culture was injected into the vial and incubated anaerobically at 30° C. under dark for one day. The resulting solution was centrifuged at 7000 rpm for 5 minutes, then washed with Milli-Q water four times to remove media components and then dried in vacuum dryer at room temperature for overnight. The dried sample was used for further characterizations.

Electrocatalytic Activity Test

The oxygen evolution reaction (OER) and hydrogen evolution reaction (HER) activity of GS/SAC were tested using a rotating disc electrode (RDE). The working electrode was prepared by the following procedure: first, the GS/SAC catalyst (~2 mg) was dispersed in 985 µl of 50% ethanol in water mixture and 15 µl of Nafion (as binder). The dispersed solution was sonicated for 1 h. 2 µl of the obtained catalyst ink was drop-coated onto a 3 mm glassy carbon disc electrode (GCE; loading concentration ~0.049 mg/cm$^2$) and vacuum dried for 1 h. The electrochemical measurement was carried out using a electrochemical working station (BioLogic VMP3, France) in 1 M KOH (Sigma Aldrich, semiconductor grade, pellets, 99.99% trace metals basis) at room temperature using a three-electrodes system, in which Pt mesh and Mercury/Mercury oxide reference electrode (Hg/HgO; 1 M KOH) were used as counter and reference electrodes, respectively. Linear sweep voltammetry (LSV) experiments were performed at a scan rate of 5 mV/s while maintaining a constant rotational speed of 1600 rpm under the nitrogen environment.

Oxygen Evolution Reaction (OER) Activity

Figure 10:
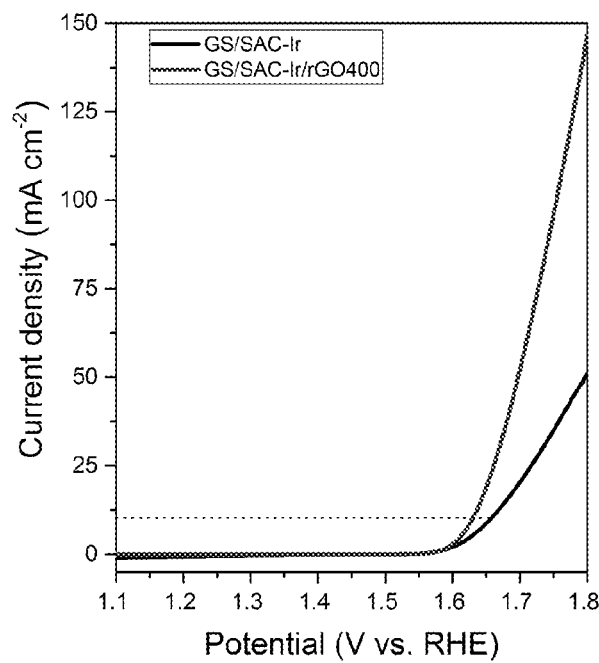
FIG. 10 shows LSV curves for oxygen evolution reaction (OER) activities of GS/SAC-Ir, and GS/SAC-Ir/rGO400 in 1M KOH at a scan rate of 5 mV/s.
Figure 11:
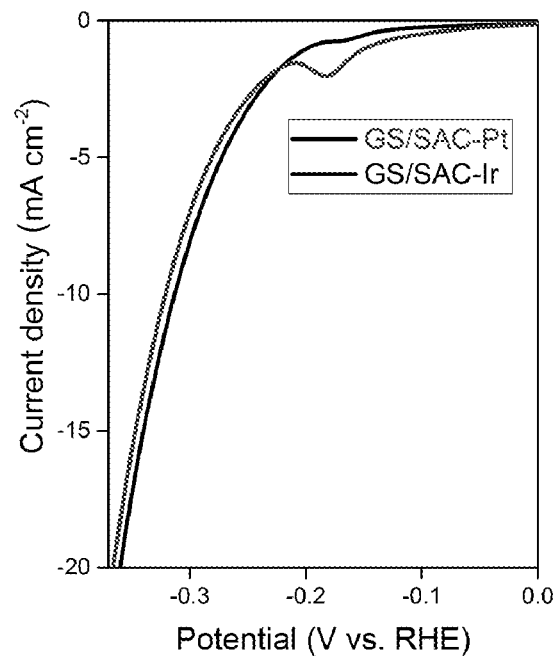
FIG. 11 shows LSV curves for hydrogen evolution reaction (HER) activities of GS/SAC-Pt, and GS/SAC-Ir in 1M KOH at a scan rate of 5 mV/s.
Figure 12:
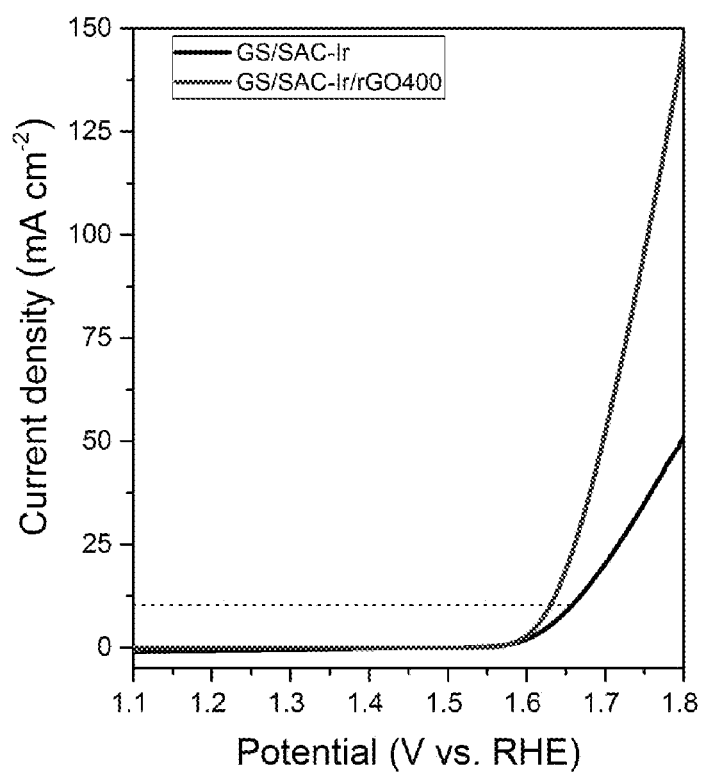
FIG. 12 shows LSV curves for oxygen evolution reaction (OER) activities of GS/SAC-Ir, and GS/SAC-Ir/rGO400 in 1M KOH at a scan rate of 5 mV/s.
Figure 13:
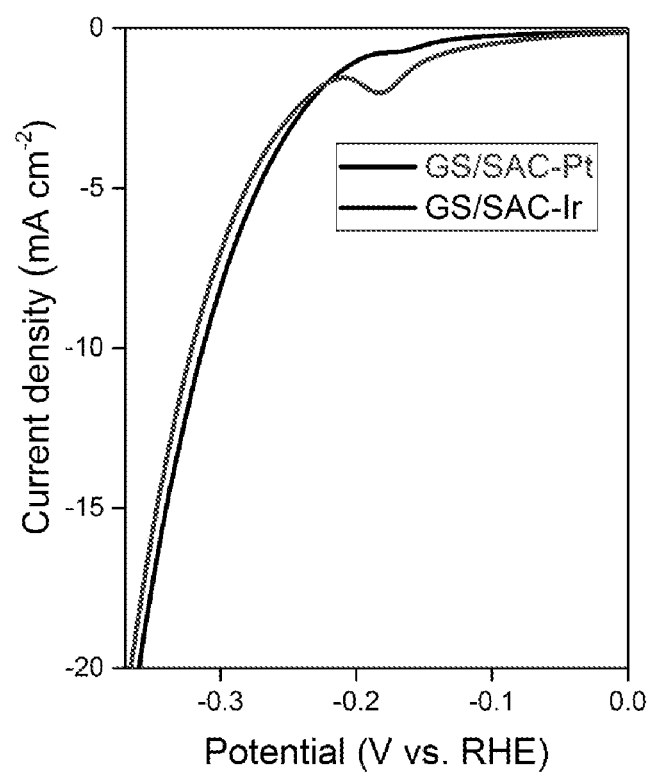
FIG. 13 shows LSV curves for hydrogen evolution reaction (HER) activities of GS/SAC-Pt, and GS/SAC-Ir in 1M KOH at a scan rate of 5 mV/s.

The OER activity of dried GS/Ir and GS/Ir/rGO were investigated using linear sweep voltammetry (LSV) in 1M KOH at a scan rate of 5 mV/s (FIG. 10). Interestingly, both GS/Ir and GS/Ir/rGO catalysts showed high OER performance with an overpotentials of 420 mV and 390 mV (vs. RHE (Reversible Hydrogen Electrode)) respectively to produce a geometric current density of 10 mA/cm$^2$ (FIG. 12). The overpotential of the GS/Ir can be further decreased by tuning the amount of rGO in the final catalyst.

Hydrogen Evolution Reaction (HER) Activity

The HER activity of as prepared GS/Pt and GS/Ir were investigated using linear sweep voltammetry (LSV) in 1M KOH at a scan rate of 5 mV/s (FIG. 12). Interestingly, both GS/Pt and GS/Ir catalysts showed high HER performance with an overpotentials of 320 mV and 310 mV (vs. RHE) respectively to produce a geometric current density of −10 mA/cm$^2$ (FIG. 12). The thigh overpotentials of the bare GS/SAC's catalysts are probably due to poor conductivity. Hence, the overpotential of the GS/SAC's can be further decreased by tuning by biological reduction of GO on the surface of bacterial cells. In conclusion, the GS/SAC's can act as bifunctional catalysts that are active for both the hydrogen evolution reaction (HER) and the oxygen evolution reaction (OER).

Figure 2:
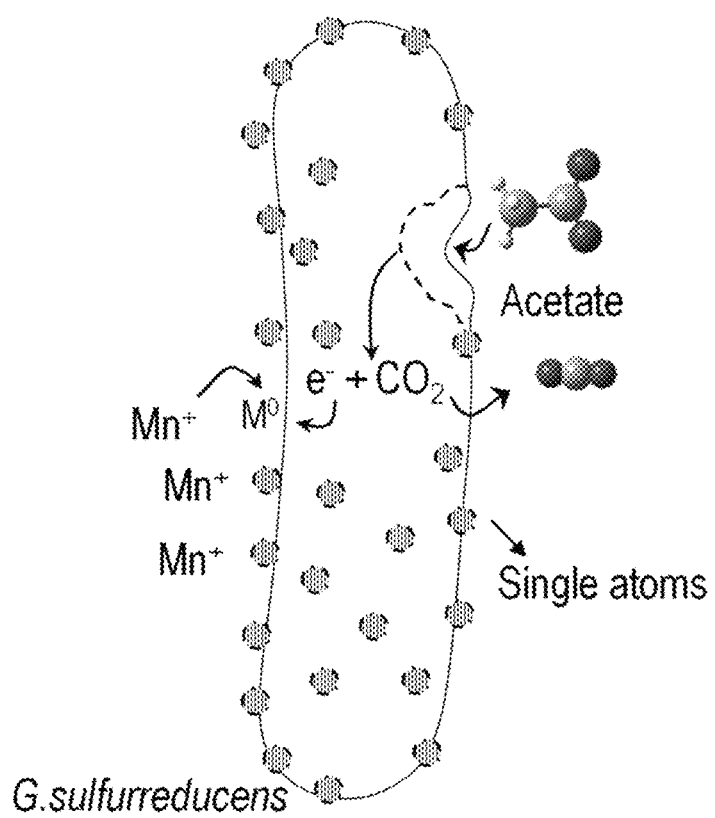
FIG. 2 shows a non-limiting illustration of the mechanism for the reduction of metal ions ($M^{n+}$) by cytochrome c (not shown) on the surface of the cell membrane of an exoelectrogen bacterial cell, such as *Geobacter sulfurreducens*. As the metal ions are reduced the zero-valent metal is deposited on the surface of the cell membrane.
Figure 3:
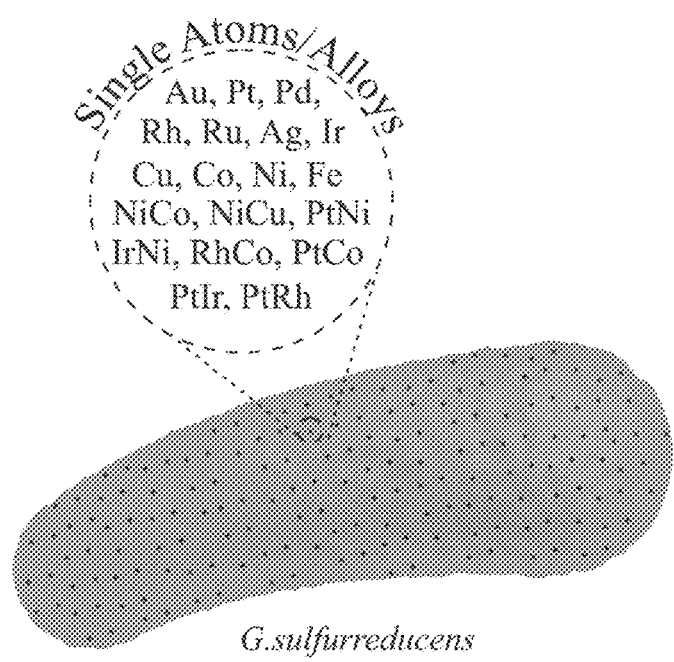
FIG. 3 shows a non-limiting illustration of single transition metal atoms deposited on the cell membrane of an exoelectrogen bacterial cell, such as *Geobacter sulfurreducens*.

Results and Discussion:

The synthetic process for the fabrication of the single metal atom catalyst by using *Geobacter sulfurreducens*, is depicted in FIG. 2. *Geobacter sulfurreducens* oxidizes an electron donor, such as acetate molecules, internally under anaerobic conditions coupled with electron transfer to the outside of the cell wall to reduce extracellular metal ions, which are the sole electron acceptors. Outer membrane c-type cytochromes, as shown in FIG. 1, mediate the electron transfer to extracellular electron acceptors (for example, the metal ions). Hence, $M^{n+}$ ions are reduced to single metal atoms $M°$ on the outer surface of the *Geobacter sulfurreducens*, as shown in FIG. 3.

Figure 4:
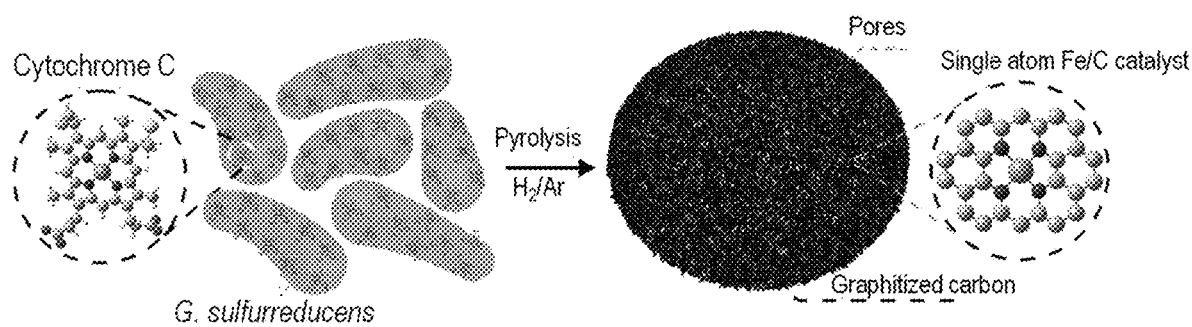
FIG. 4 shows a non-limiting schematic representation of fabrication of single atom heterogeneous catalysts by pyrolysis of exoelectrogen bacterial cells, such as *Geobacter sulfurreducens* cells.

As shown in FIG. 4, single metal atom catalysts can be prepared by pyrolyzing *Geobacter sulfurreducens* cells resulting in the formation of graphitized carbon having single zero-valent metal atoms (and/or bimetallic, trimetallic, or multimetallic alloys thereof) dispersed on the surface of the graphitized carbon.

Sub-Angstrom resolution, aberration-corrected scanning transmission electron microscopy (STEM) (not shown) was used for the morphological characterization of the Fe/C and Pt/C catalysts prepared. Individual metal atoms can be clearly observed in the atomic resolution high-angle annular dark-field (HAADF) images (not shown). For the Fe/C catalyst, a uniform dispersion of isolated Fe atoms (white dots) was observed on the surface of *G. sulfurreducens* (not shown). Examination of various regions strongly confirmed only the presence of single Fe atoms. The presence of a porous structure in the Fe/C catalyst was confirmed by High resolution TEM image (not shown).

Figure 5:
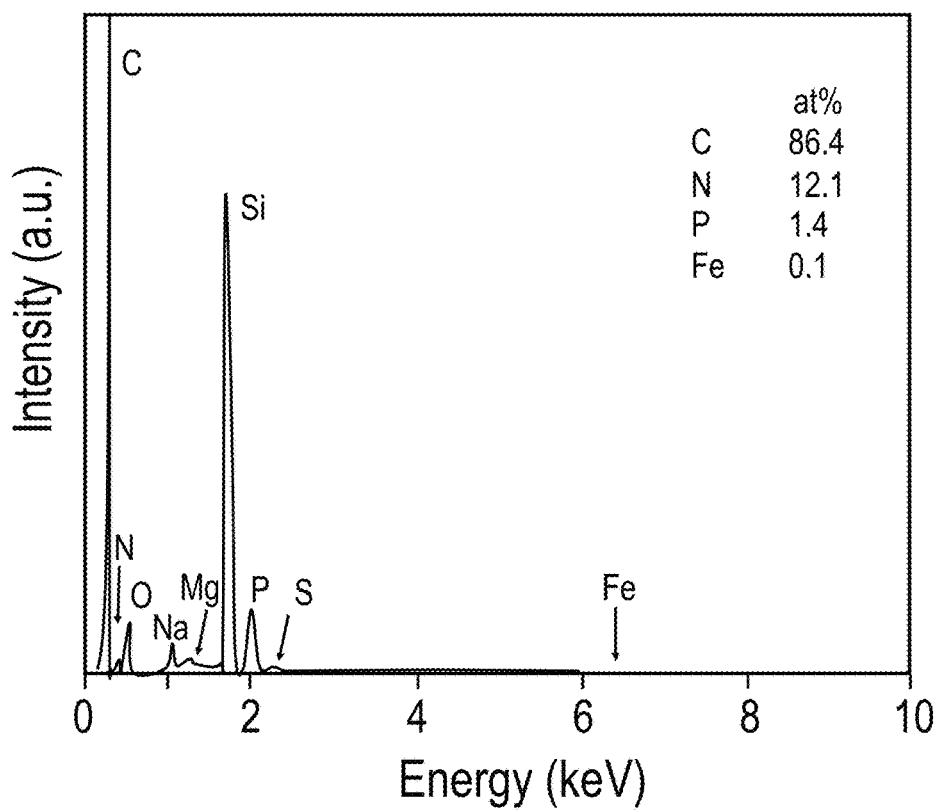
FIG. 5 is a graph of the energy-dispersive X-ray spectroscopy (EDS) elemental mapping of an Fe/C catalyst prepared by pyrolysis of *Geobacter sulfurreducens* cells.

FIG. 5 shows the energy-dispersive X-ray spectroscopy (EDS) analysis of the Fe/C catalyst which showed high quantity of carbon (86.4 atomic %) along with nitrogen (12.1 atomic %), phosphorous (1.4 atomic %) and iron (0.1 atomic %). The presence of the Si peak was attributed to the silicon substrate on which the catalyst was dispersed for SEM measurement.

Figure 6:
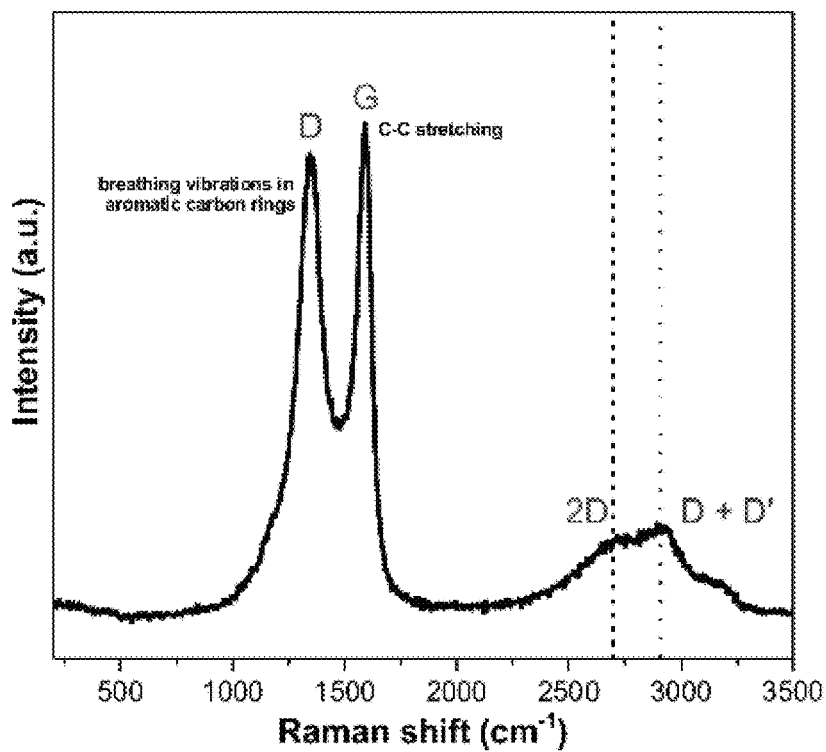
FIG. 6 is a Raman spectrum showing D, G, 2D, and D+D' bands of an Fe/C catalyst prepared by pyrolysis of *Geobacter sulfurreducens* cells and also confirming the presence of graphitized carbon having defects.

Raman spectroscopy and powder X-ray diffraction (XRD) was used to measure the degree of crystallinity of the graphitized carbon in Fe/C. The Raman spectrum shown in FIG. 6 demonstrated the existence of graphitized carbons in the Fe/C catalyst. The Raman peaks observed at 1,347 and 1,590 cm$^{-1}$ correspond to the D (breathing vibrations in aromatic carbon rings due to defects) and G (graphitic) bands, respectively. The ratio of intensities of the D and G bands ($I_D/I_G$) was 0.93, indicating a low degree of graphitization in the Fe/C catalyst.

Figure 7A:
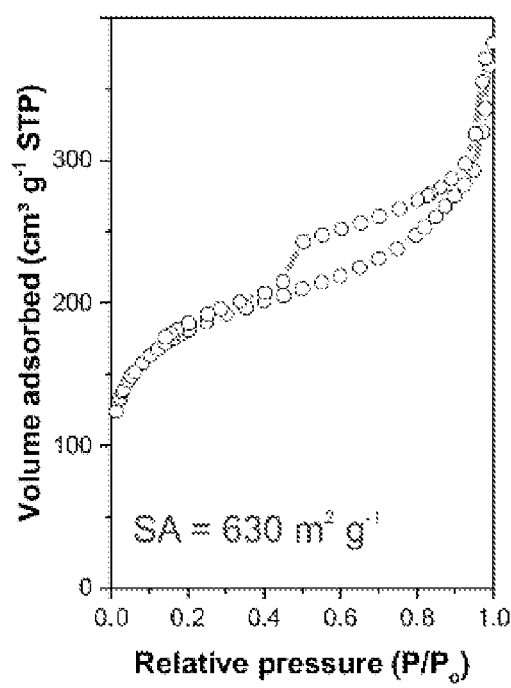
FIGS. 7A and 7B show the Brunauer-Emmett-Teller (BET) surface area and pore volume data, respectively for an Fe/C catalyst prepared by pyrolysis of *Geobacter sulfurreducens* cells.
Figure 7B:
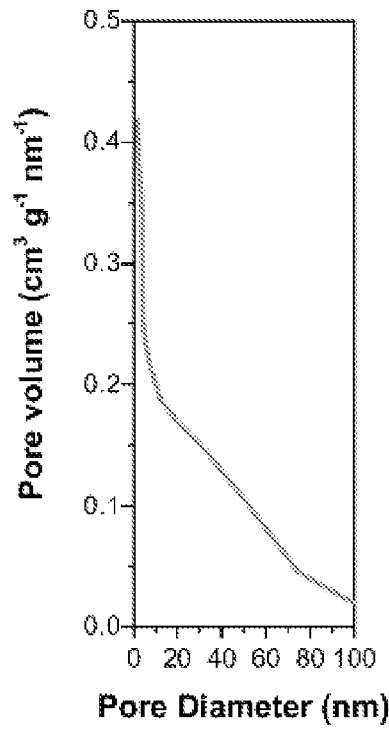

The specific surface area (SSA) and pore volume of the Fe/C catalyst was measured by the Brunauer-Emmett-Teller (BET) method. $N_2$ adsorption-desorption isotherms of Fe/C (FIG. 7A) showed typical type IV isotherms with H1 hysteresis loops observed, which indicate the existence of mesopores. A BET SSA of 630 m$^2$ g$^{-1}$ was measured and a mesopore volume of 0.42 cm$^3$ g$^{-1}$ was observed for the Fe/C catalyst (FIG. 7B). The high surface area and meso-porous structure observed in the Fe/C catalyst are indicative of the electro-catalytic properties of the catalyst.

Figure 8:
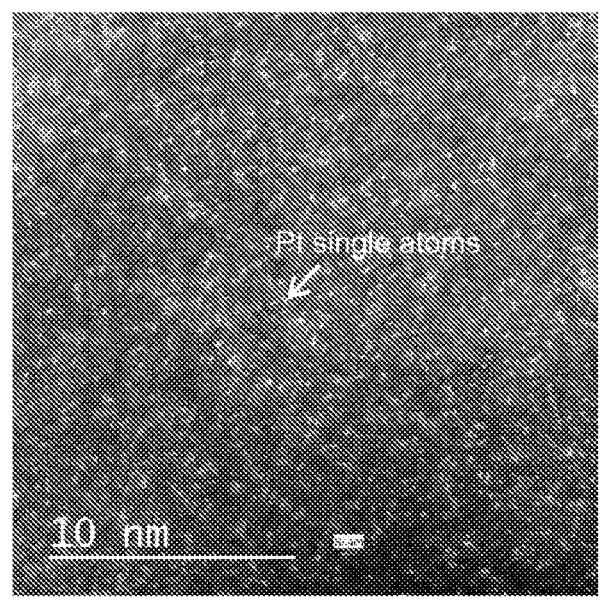
FIG. 8 shows a high-angle annular dark-field scanning tunneling electron microscopy (HAADF-STEM) image of an Fe/C catalyst prepared by pyrolysis of *Geobacter sulfurreducens* cells which shows atomically precise isolated single atoms of Pt dispersed on the carbonaceous component of the Fe/C catalyst.

For the Pt/C catalyst, HAADF images recorded at different regions clearly revealed that only isolated Pt atoms (white dots) were present and uniformly dispersed on the graphitized carbon of the Pt/C catalyst, as shown in FIG. 8.

Figure 9:
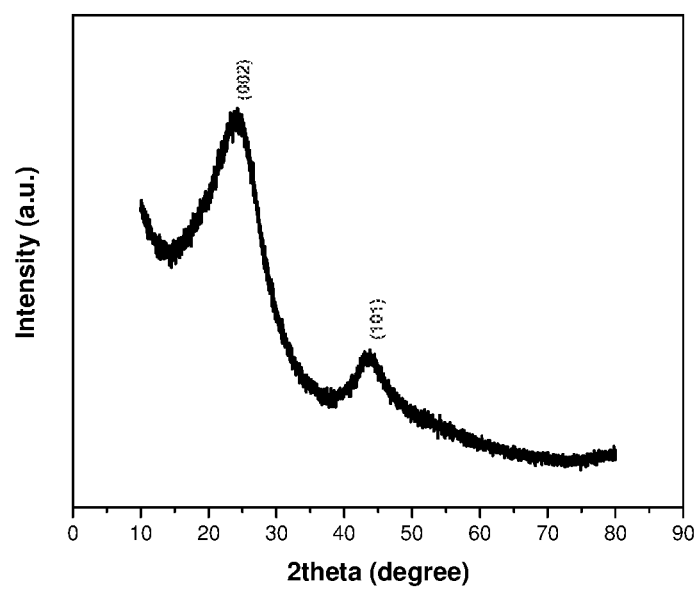
FIG. 9 shows the X-ray diffraction (XRD) pattern of an Fe/C catalyst prepared by pyrolysis of *Geobacter sulfurreducens* cells.

The XRD pattern of the Fe/C catalyst is shown in FIG. 9 and showed two diffraction peaks at 2θ=24.2° and 43.6° corresponding to the reflections of the (002) and (101) planes of activated carbon. The (002) peak is typical for graphitic carbon with a low degree of graphitization, ascribing to the defects and heteroatoms doping (i.e., N and O) which are believed to originate from the *Geobacter sulfurreducens* bacteria.

HAADF-STEM images confirmed the successful fabrication of atomically precise single atoms of Ir, Ru, Pd and Cu. Only isolated atoms (white dots) are present and uniformly dispersed on the microbial surface (data not shown). Examination of multiple regions reveals that only individual atoms are present in the catalyst.

Lastly, formation or the presence of metal aggregates/clusters was not observed in the scanning electron microscope (SEM) images, transmission electron microscopy (TEM) images, and X-ray diffraction (XRD) patterns of the as-prepared Fe/C and Pt/C catalysts prepared according to the methods above.

In summary, all of the above characterizations collectively confirmed the fabrication of single atom metal catalysts from electro-active bacteria.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A bimetallic alloy catalyst, comprising:
a carbonaceous support; and
a plurality of at least one type of zero-valent transition metal dispersed on the carbonaceous support,
wherein the at least one zero-valent transition metal is selected from the group consisting of Pt, Fe, Ag, Au, Pd, Rh, Ru, Ir, Co, Ni, Cu, and combinations thereof; and
wherein the plurality of the at least one type of zero-valent transition metal is formed of isolated single atoms of the zero-valent transition metal which are dispersed on the carbonaceous support, and
wherein the at least one zero-valent transition metal is a bimetallic alloy of at least two transition metals.

2. The catalyst of claim 1, wherein the bimetallic alloy is selected from the group consisting of NiCo, NiCu, PtNi, IrNi, RhCo, PtCo, PtIr, PtRh, and combinations thereof, wherein the carbonaceous support is a graphitized carbon comprising hydrogen doping or heteroatom doping; wherein the heteroatoms are selected from the group consisting of nitrogen, oxygen, sulfur, phosphorus, and combinations thereof.

3. The catalyst of claim 1, wherein the bimetallic alloy is uniformly dispersed on one or more surfaces of the carbonaceous support.

4. A single atom or bimetallic alloy catalyst comprising, a carbonaceous support; and
a plurality of at least one type of zero-valent transition metal dispersed on the carbonaceous support,
wherein the at least one zero-valent transition metal is selected from the group consisting of Pt, Fe, Ag, Au, Pd, Rh, Ru, Ir, Co, Ni, Cu, and combinations thereof; and
wherein the plurality of the at least one type of zero-valent transition metal is formed of isolated single atoms of the zero-valent transition metal which are dispersed on the carbonaceous support,
wherein the catalyst does not comprise aggregates and/or clusters of zero-valent metals.

5. The catalyst of claim 4, wherein the carbonaceous support is a graphitized carbon.

6. The catalyst of claim 4, wherein the carbonaceous support has a surface area, as measured by Brunauer-Emmett-Teller method, ranging from about 100 to 700 $m^2$ $g^{-1}$.

7. The catalyst of claim 4, wherein the plurality of the at least one type of zero-valent transition metal is uniformly dispersed on surfaces of the carbonaceous support.

8. The catalyst of claim 4, wherein the carbonaceous support is mesoporous.

9. The catalyst of claim 8, wherein the mesoporous carbonaceous support comprises mesopores having a volume ranging from about 0.1 to 0.8 $cm^3$ $g^{-1}$.

10. The catalyst of claim 4, wherein the catalyst is an electrocatalyst or a photocatalyst.

11. A single atom or bimetallic alloy catalyst comprising:
a carbonaceous support; and
a plurality of at least one type of zero-valent transition metal dispersed on the carbonaceous support,
wherein the carbonaceous support is a graphitized carbon comprising hydrogen doping or heteroatom doping;
wherein the heteroatoms are selected from the group consisting of nitrogen, oxygen, sulfur, phosphorus, and combinations thereof.

12. The catalyst of claim 11, wherein the heteroatoms present in the carbonaceous support originate from exoelectrogen bacteria selected from the group consisting of *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof.

13. The catalyst of claim 11, wherein the at least one zero-valent transition metal is (a) selected from the group consisting of Pt, Fe, Ag, Au, Pd, Rh, Ru, Ir, Co, Ni, Cu, and combinations thereof; or (b) a bimetallic alloy of at least two transition metals selected from the group consisting of NiCo, NiCu, PtNi, IrNi, RhCo, PtCo, PtIr, PtRh, and combinations thereof.

14. The catalyst of claim 11, wherein the plurality of the at least one type of zero-valent transition metal is: (a) uniformly dispersed on surfaces of the carbonaceous support; or (b) formed of isolated single atoms of the zero-valent transition metal which are dispersed on the carbonaceous support.

15. The catalyst of claim 11, wherein: (a) the catalyst does not comprise aggregates and/or clusters of zero-valent metals; (b) the carbonaceous support is mesoporous, comprising:
mesopores having a volume ranging from about 0.1 to 0.8 $cm^3$ $g^{-1}$; and/or (c) the carbonaceous support has a surface area, as measured by Brunauer-Emmett-Teller method, ranging from about 100 to 700 $m^2$ $g^{-1}$.

16. A method of preparing a single atom or bimetallic alloy catalyst, comprising a carbonaceous support and a plurality of at least one of the zero-valent transition metals selected from the group consisting of Pt, Fe, Ag, Au, Pd, Rh, Ru, Jr, Co, Ni, Cu, and combinations thereof, dispersed on the carbonaceous support, in the form of isolated single atoms of the zero-valent transition metal,
the method comprising the steps of:
(a) preparing a solution medium comprising at least an electron donor and an electron acceptor comprised of one or more salts of a transition metal;
(b) providing exoelectrogen bacterial cells and mixing the exoelectrogen bacterial cells into the solution medium of step (a);
(c) incubating the solution medium of step (b);
(d) isolating the exoelectrogen bacterial cells from the incubated solution medium of step (c); and
(e) pyrolyzing the exoelectrogen bacterial cells resulting in formation of the catalyst.

17. The method of claim 16, wherein the electron donor is formate, acetate, or hydrogen.

18. The method of claim 16, wherein the transition metal of the one or more salts forms a soluble $M^{n+}$ metal ion where n is 1, 2, or 3 and M is selected from the group consisting of Pt, Fe, Ag, Au, Pd, Rh, Ru, Ir, Co, Ni, and Cu.

19. The method of claim 16, wherein exoelectrogen bacterial cells are selected from the group consisting of *Geobacter sulfurreducens, Desulfuromonas acetexigens, Geobacter metallireducens, Shewanella oneidensis* MR-1, *Shewanella putrefaciens* IR-1, *Clostridium butyricum, Rhodoferax ferrireducens, Aeromonas hydrophilia* (A3), *Desulfobulbus propionicus, Shewanella oneidensis* DSP10, *Rhodoseudomonas palustris, Geothrix fermentans, Geopsychrobacter electrodiphilus*, and combinations thereof.

* * * * *